B. M. LEECE.
STARTING AND LIGHTING APPARATUS.
APPLICATION FILED DEC. 22, 1913.
1,286,182.
Patented Nov. 26, 1918.
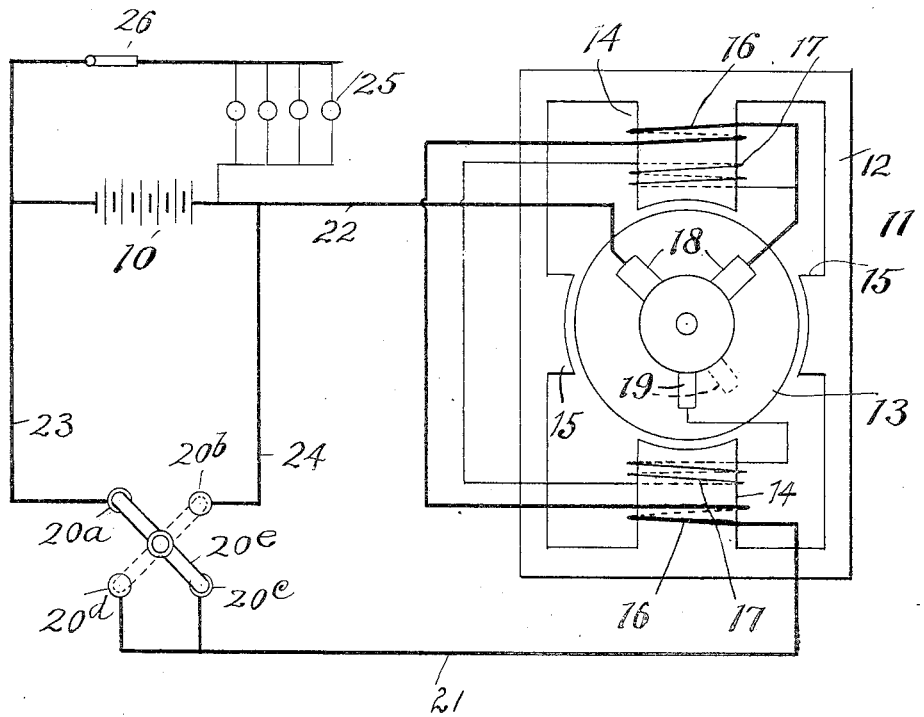

UNITED STATES PATENT OFFICE.

BENNETT M. LEECE, OF CLEVELAND, OHIO, ASSIGNOR TO THE LEECE-NEVILLE COMPANY, OF CLEVELAND, OHIO, A CORPORATION OF OHIO.

STARTING AND LIGHTING APPARATUS.

1,286,182.  Specification of Letters Patent.  Patented Nov. 26, 1918.

Application filed December 22, 1913. Serial No. 808,064.

*To all whom it may concern:*

Be it known that I, BENNETT M. LEECE, a citizen of the United States, residing at Cleveland, in the county of Cuyahoga and State of Ohio, have invented a certain new and useful Improvement in Starting and Lighting Apparatus, of which the following is a full, clear, and exact description.

This invention relates to starting and lighting apparatus adapted especially for engine driven vehicles such as automobiles and boats, and has for its principal object to provide an apparatus of this character having a single dynamo electric machine for both cranking and generating, and which while possessing the features of simplicity and compactness, is highly efficient both as a motor and as a generator, producing a strong field and powerful torque during cranking, and during generating having a regulating action which admirably adapts it for battery charging and lighting purposes under variable speed conditions.

The above and other more specific but important advantages are attained by my invention which may be here briefly summarized as consisting in certain novel combinations and arrangements of parts which will be described in the specification and set forth in the appended claim.

The single figure of the drawing shows diagrammatically a starting and lighting system embodying my invention.

I employ in my improved starting and lighting system or apparatus, a storage battery 10 and a dynamo electric machine 11, which serves both as a motor to crank the engine and then as a generator to supply current to the lamps or to the battery, or to any other translating devices.

This machine which is preferably of the four-pole type includes a field member 12, and an armature 13, the field member 12 having two oppositely disposed wound poles 14, and two oppositely disposed short consequent poles 15, which are unwound.

The field windings of the machine include a series winding 16, and a shunt winding 17. The current traverses these windings in such a manner that when the machine is serving as a motor, the fields produced by the shunt and series field windings are additive or assist each other, so as to provide maximum field strength and torque, and when the machine is changed to a generator, the current reverses in the series winding so that the field produced thereby opposes the field produced by the shunt winding, with the result that the current passing through the series winding has a current regulating action, the opposing and regulating effect varying with the speed.

I utilize two main brushes 18 which are in this case disposed 90° apart, and to which the main conductors extending between the dynamo electric machine and battery are connected. I also utilize an auxiliary brush 19, which is between the main brushes and to which one terminal of the shunt field winding 17 is connected. This brush, it will be observed, is located opposite one of the main field poles or in such a position that the voltage, and consequently the current passing through the shunt winding is affected by distortion or shifting of the field, due to change in speed. One terminal of the shunt winding is connected to a conductor or terminal leading to one tof the main brushes 18, and the other terminal of the shunt field winding is connected to this auxiliary brush 19, as before stated. It will be observed that the voltage between the terminals of the shunt field winding is considerably less than the voltage between the main brushes, and that if the auxiliary brush is just midway between the brushes 18, the voltage impressed on the shunt field winding will be half that of the voltage between the main brushes.

I prefer to mount this auxiliary brush 19 so that it may be adjusted within suitable limits relative to the main brushes, circumferentially about the commutator, so that the effective voltage which is impressed on the shunt winding, and consequently the value of the current passing through the shunt winding may be varied. This admits of variation in current output. This brush 19 which is preferably located opposite or nearly opposite the middle of the main field pole, admits of closer regulation than is produced simply by the differential action of the field windings, for when the speed varies, there is more or less of a shifting or distortion of the main field flux passing between the armature and the main field pole adjacent said auxiliary brush, and this tends to vary the voltage between the auxiliary brush and its coöperating main brush inversely with the speed.

By impressing on the terminals of the shunt winding a voltage which is low relative to the armature voltage and by accomplishing this with an auxiliary brush which affords the regulating action, I am enabled to use in the shunt winding a large conductor and pass through the winding a current which even at low speeds saturates the field. In consequence, I need not employ a large number of turns in the shunt winding; the size of the machine as a whole can be made quite small, and the machine will begin to generate at a low engine speed.

In the control of the machine, I utilize a switch shown at 20, which not only serves to connect and disconnect the dynamo electric machine 11 and storage battery 10, but has an additional important function. This switch, as here shown, has four contacts $20^a$, $20^b$, $20^c$, and $20^d$, and is provided with a movable switch member $20^e$, which is pivoted between its ends and is adapted to be moved to a position such as to engage and bridge the contacts $20^a$ and $20^c$, or to engage and bridge the contacts $20^b$ and $20^d$.

It will be observed by tracing the circuits, that connection is made from one of the main brushes 18 to the series winding on one pole, then to the series winding on the opposite pole, and then connection is made by a conductor 21 and suitable branch conductors to contacts $20^d$ and $20^c$, and that connection is made from the other main brush 18 by conductor 22 to one terminal of the battery, the opposite terminal of the battery being connected by conductor 23 to contact $20^a$. Also the contact $20^b$ of the switch is connected by conductor 24 to the conductor 22 at a point between the battery and the dynamo electric machine.

In consequence, when the switch is in the position shown in the drawing, the battery and dynamo electric machine are connected, and if it is moved to this position, with all parts idle, the machine will serve as a motor to crank the engine, and as soon as the engine is started, it will drive the dynamo electric machine, and when the voltage of the machine exceeds that of the battery, the machine will begin charging the battery. If now, it is desired to render the current generating apparatus inoperative, while the engine is running, the movable switch member is moved to the position shown by dotted lines so as to engage the contacts $20^b$ and $20^d$. When the switch is shifted to this position, not only does it disconnect the battery and dynamo electric machine, but it short circuits the machine, and thus eliminates all danger of the voltage in the shunt winding building up and of the winding burning out, as might be the case if the machine were run idle on open circuit. At 25, are shown in conventional manner, the lamps of the lighting circuit which are connected or may be connected through a suitable switch 26 to the battery-dynamo-electric machine circuit, so that said lighting circuit may receive current from either the battery or generator.

It will be seen therefore that I have provided certain improvements in the regulation and control of dynamo electric machines adapted particularly for starting and lighting apparatus having the following important features. First, there is a current regulating action due to the fact that the series and shunt coils oppose each other, or have a differential action when the machine is serving as a generator.

Second.—One terminal of the shunt winding is connected to the auxiliary brush which is so located with respect to the main brushes that the voltage between the terminals of the shunt winding is considerably less than the voltage between the main terminals, and which may be adjusted to vary the voltage between the terminals of the shunt winding, and consequently, the current passing through the shunt winding.

Third.—This auxiliary brush results in a regulating action, since the voltage impressed on the terminals of the shunt winding is affected by the shifting or distortion of the field flux when the speed is varied.

Fourth.—Provision is made in the switching mechanism for short circuiting the dynamo electric machine when it is disconnected from the battery so as to avoid liability of injury to the machine, when it is run as an idle machine. This feature is extremely useful, inasmuch as it enables the operator to safely disconnect the battery and dynamo electric machine at will, to avoid overcharging or undue heating of the battery.

The engine may drive the dynamo electric machine or be driven thereby in any suitable manner, but preferably through a single power transmitting agency consisting of chain and sprocket gearing connecting or extending between the engine crank shaft or a continuation thereof and the shaft of the dynamo electric machine.

Having thus described my invention, what I claim is:

In a starting and lighting apparatus for a vehicle having an internal combustion engine, a dynamo electric machine adapted to serve as a motor to start the engine and to be driven by the engine as a generator, said dynamo electric machine comprising an armature, a commutator having main brushes and an auxiliary brush, and a field member having a main shunt winding and a series winding, said machine when serving both as a motor and a generator having the shunt winding connected between the auxiliary brush and a main brush so that when the machine is serving as a generator the voltage across the terminals of the shunt winding will vary inversely with the speed, and the series winding being in circuit both when the machine is serving as a motor and a generator and assisting the shunt field winding when the machine is serving as a motor and opposing the shunt field winding when the machine is serving as a generator.

In testimony whereof I hereunto affix my signature in the presence of two witnesses.

BENNETT M. LEECE.

Witnesses:
   GEO. S. COLE,
   ILLE UECRELE.